US008882275B2

(12) United States Patent
Sugitani et al.

(10) Patent No.: US 8,882,275 B2
(45) Date of Patent: *Nov. 11, 2014

(54) LIGHT SOURCE DEVICE

(75) Inventors: Akihiko Sugitani, Hyogo (JP);
Kiyoyuki Kabuki, Hyogo (JP);
Yoshihiro Horikawa, Hyogo (JP);
Yoshio Okazaki, Hyogo (JP)

(73) Assignee: Ushio Denki Kabushiki Kaisha, Tokyo (JP)

( * ) Notice: Subject to any disclaimer, the term of this patent is extended or adjusted under 35 U.S.C. 154(b) by 309 days.

This patent is subject to a terminal disclaimer.

(21) Appl. No.: 13/445,489

(22) Filed: Apr. 12, 2012

(65) Prior Publication Data

US 2012/0262676 A1    Oct. 18, 2012

(30) Foreign Application Priority Data

Apr. 12, 2011  (JP) ................................ 2011-088546

(51) Int. Cl.
| | | |
|---|---|---|
| *G03B 21/00* | (2006.01) | |
| *G03B 21/20* | (2006.01) | |
| *G02B 27/10* | (2006.01) | |
| *H04N 9/31* | (2006.01) | |
| *G03B 33/12* | (2006.01) | |

(52) U.S. Cl.
CPC .......... *G02B 27/102* (2013.01); *G03B 21/2073* (2013.01); *H04N 9/3111* (2013.01); *G03B 21/2033* (2013.01); *H04N 9/3164* (2013.01); *G03B 33/12* (2013.01); *H04N 9/3161* (2013.01)

USPC .................. 353/31; 353/30; 353/37; 353/85; 353/94; 353/99; 348/38; 348/744

(58) Field of Classification Search
USPC ................ 353/30, 31, 37, 38, 84, 85, 94, 99; 348/38, 743–747, 750, E9.026; 362/555, 19, 231, 559; 349/5, 7–9
See application file for complete search history.

(56) References Cited

U.S. PATENT DOCUMENTS

| | | | |
|---|---|---|---|
| 8,104,901 B2 * | 1/2012 | Kwon .............................. 353/84 |
| 2007/0165189 A1 * | 7/2007 | Kawase et al. ................... 353/31 |
| 2007/0268458 A1 * | 11/2007 | Lee et al. .......................... 353/31 |
| 2008/0218699 A1 * | 9/2008 | Lapchuk et al. ................. 353/31 |
| 2009/0135376 A1 * | 5/2009 | Itoh et al. .......................... 353/31 |
| 2009/0141327 A1 * | 6/2009 | Penn et al. ................... 359/201.1 |

FOREIGN PATENT DOCUMENTS

JP         3896074 B2    12/2006

* cited by examiner

*Primary Examiner* — Sultan Chowdhury
(74) *Attorney, Agent, or Firm* — Rader, Fishman & Grauer PLLC

(57) ABSTRACT

In a light source device, in each division of an image frame, two or more of the color lights X, Y and Z (e.g., red, green and blue) can be projected simultaneously. Each of the color lights X, Y and Z is divided into two in terms of time so that synthesized light of one group of division color lights enters a first spatial modulation element. Synthesized light of another group of division color lights enters a second spatial modulation element, whereby gradation of each color light in each of the first and second spatial modulation elements is controlled.

11 Claims, 8 Drawing Sheets

| Frame number | 1 | | | | | | 2 | | | | | |
|---|---|---|---|---|---|---|---|---|---|---|---|---|
| Time division | S1 | S2 | S3 | S4 | S5 | S6 | S1 | S2 | S3 | S4 | S5 | S6 |
| 1st laser light source op. | ON | OFF | OFF | ON | ON | OFF | ON | OFF | OFF | ON | ON | OFF |
| 2nd laser light source op. | OFF | OFF | ON | ON | OFF | OFF | OFF | OFF | ON | ON | OFF | OFF |
| 3rd laser light source op. | OFF | ON | ON | OFF | OFF | ON | OFF | ON | ON | OFF | OFF | ON |
| Optical path by 1st OPSE | Optical path xl | | | | | | Optical path xII | | | | | |
| Optical path by 2nd OPSE | Optical path yII | | Optical path yl | | | | Optical path yII | | Optical path yl | | | O.P. yII |
| Optical path by 3rd OPSE | O.P. zl | Optical path zII | | | | Optical path zl | | Optical path zII | | | Optical path zl | |
| Incident light on 1st S.M.E. | X | | Y | X | Z | | X | | Y | X | Z | |
| Incident light on 2nd S.M.E | Y | Z | | | | X | Y | Z | | | | Y |
| Color image of Synthesized L.I. | X, Y | X, Z | Y, Z | X, Y | X, Z | Y, Z | X, Y | X, Z | Y, Z | X, Y | X, Z | Y, Z |

FIG. 2

| Frame number | 1 | | | | | | | | 2 | | | | | | | |
|---|---|---|---|---|---|---|---|---|---|---|---|---|---|---|---|---|
| Time division | S1 | S2 | S3 | S4 | S5 | S6 | S7 | S8 | S1 | S2 | S3 | S4 | S5 | S6 | S7 | S8 |
| 1st laser light source op. | | | | | | ON | | | | | | | | | | |
| 2nd laser light source op. | | | | | | ON | | | | | | | | | | |
| 3rd laser light source op. | | | | | | ON | | | | | | | | | | |
| Optical path by 1st OPSE | Optical path xl | | | | Optical path xll | | | | Optical path xl | | | | Optical path xll | | |
| Optical path by 2nd OPSE | Optical path yll | | | Optical path yl | | | | Optical path yll | | | Optical path yl | | | | | |
| Optical path by 3rd OPSE | O.P. zl | | Optical path zll | | | | Optical path zl | | | Optical path zll | | | | | O.P. yll | Optical path zl |
| Incident light on 1st S.M.E. | XZ | X | XY | Y | YZ | Z | XY,Z | X,YZ | XZ | X | XY | Y | YZ | Z | Y,Z | X,YZ |
| Incident light on 2nd S.M.E. | Y | YZ | Z | XZ | X | XY | X,YZ | XY,Z | Y | YZ | Z | XZ | X | XY | X | XY |
| C.L. of Synthesized L.I. | XZ,Y | X,YZ | XY,Z | XZ,Y | X,YZ | XY,Z | X,YZ | XY,Z | XZ,Y | X,YZ | XY,Z | XZ,Y | X,YZ | XY,Z | X,YZ | XY,Z |

FIG. 3

| Frame number | 1 | | | | | | 2 | | | | | |
|---|---|---|---|---|---|---|---|---|---|---|---|---|
| Time division | S1 | S2 | S3 | S4 | S5 | S6 | S1 | S2 | S3 | S4 | S5 | S6 |
| 1st laser light source op. | ON | ON | OFF | ON | ON | OFF | OFF | ON | OFF | ON | ON | OFF |
| 2nd laser light source op. | ON | OFF | ON | OFF | OFF | ON | ON | OFF | ON | OFF | OFF | ON |
| 3rd laser light source op. | OFF | ON | ON | OFF | ON | ON | OFF | ON | ON | OFF | ON | ON |
| Optical path by 1st OPSE | Optical path xl | | Optical path xl | | Optical path xll | | Optical path xl | | Optical path xl | | Optical path xll | |
| Optical path by 2nd OPSE | Optical path yl | | Optical path yl | | Optical path yl | | Optical path yl | | Optical path yl | | Optical path yll | |
| Optical path by 3rd OPSE | O.P. zl | Optical path zll | | Optical path zl | | Optical path zll | | | | Optical path zll | | Optical path zl |
| Incident light on 1st S.M.E. | X | | | Y | | Z | | X | | Y | | Z |
| Incident light on 2nd S.M.E. | Y | Z | | X | | | Y | Z | | X | | Y |
| Color wheel operation | A | B | C | D | E | F | A | B | C | D | E | F |
| C.L of Synthesized L.I. | X,Y | X,Z | Y,Z | X,Y | X,Z | Y,Z | X,Y | X,Z | Y,Z | X,Y | X,Z | Y,Z |

FIG. 6

| Frame number | 1 | | | | 2 | | | |
|---|---|---|---|---|---|---|---|---|
| Time division | S1 | S2 | S3 | S4 | S1 | S2 | S3 | S4 |
| Color wheel operation | 83b | 83r | 83g | 83w | 83b | 83r | 83g | 83w |
| Incident light on S. M. E. | blue light | red light | green light | white light | blue light | red light | green light | white light |
| Gradation levels by S. M. E. | 256 | 256 | 256 | 256 | 256 | 256 | 256 | 256 |

FIG. 8
PRIOR ART

LIGHT SOURCE DEVICE

CROSS-REFERENCES TO RELATED APPLICATION

This application claims priority from Japanese Patent Application Serial No. 2011-088546 filed Apr. 12, 2011, the contents of which are incorporated herein by reference in its entirety.

BACKGROUND OF THE INVENTION

The present invention relates to a light source device for a projector, which is installed in a projector apparatus equipped with a spatial modulation element such as a liquid crystal display device and a digital micro-mirror device.

In recent years, a projector apparatus, which is equipped with a spatial modulation element such as a liquid crystal display device and a digital micro-mirror device, has been developed. A color sequential display type projector apparatus is known as such a projector apparatus, in which lights consisting of the three primary colors are sequentially formed bypassing white light emitted from a white light source through a color wheel which is driven to rotate, and a full color image is displayed by irradiating each pixel with each of the three primary color lights one by one (Refer to Japanese Patent No. 3896074).

FIG. 7 shows the structure of an example of such a color sequential display type projector apparatus according to the prior art. The projector apparatus 80 comprises a light source lamp 81 which emits white light, an elliptical reflection mirror 82 which condenses the light from light source lamp 81, a color wheel 83, which is driven to rotate, and which divides, in terms of time, the light from the light source lamp 81, thereby sequentially forming lights consisting of the three primary color and white light, a rod integrator 84 for receiving and making uniform the light which passes through the color wheel 83, a flat reflection mirror 85 which reflects the light emitted from the rod integrator 84, a reflection type spatial modulation element 86 which the light from the flat reflection mirror 85 enters so that a light image is emitted therefrom, a spatial modulation element actuator 87 which drives the spatial modulation element 86, and a projection lens 88 which projects the light image emitted from the spatial modulation element 86 on a screen. The color wheel 83 comprises a filter element 83b which transmits blue light, a filter element 83r which transmits red light, a filter element 83g which transmits green light, and a filter element 83w which transmits white light, wherein these filter elements are respectively in a shape of a partial sector, and are aligned so as to form an annular shape on the same plane.

In such a projector apparatus 80, when the white light from the light source lamp 81 passes through the color wheel 83 which is driven to rotate, the white light is filtered by the filter element that is in the optical path of the white light, the filter element changing sequentially according to the rotation of the color wheel 83, thereby sequentially forming for a period of time white light and three primary color lights which are blue light, red light and green light. Then, when these primary color lights and the white light enter the spatial modulation element 86 one by one through the rod integrator 84 and the flat reflection mirror 85, a light image, which is made up of the respective primary color lights and the white light, is formed. And when the light image made up of the respective primary color lights and the white light which are emitted from the spatial modulation element 86 is projected sequentially on the screen through the projection lens 88, a desired color image is formed on the screen.

However, the projector apparatus 80 described above has the following problems:

(1) Because the light from the light source lamp 81 is filtered in each period of time into respective primary color lights and white light by the color wheel 83, the light intensity which is actually projected is, for example, a half ($\frac{1}{2}$) of the light intensity of light emitted from the light source lamp 81, so that the usage efficiency of the light is very low. As shown in FIG. 8, the projection time for forming one frame of an image to be displayed, is divided into four time divisions S1-S4 which sequentially continue in terms of time. When the color wheel 83 is operated, for example, blue light enters the space modulation element 86 in the time division S1, red light enters it in the time division S2, green light enters it in the time division S3, and white light enters it in the time division S4. In the time division S4, approximately all color light components emitted from the light source lamp 81 pass through the color wheel 83 and are used (the intensity of light used therein is one quarter ($\frac{1}{4}$) of that in the entire time divisions S1-S4). Although, in the time division S1, blue light among the light components emitted from the light source lamp 81 passes through the color wheel 83 and is used, the other color light components are wasted (the intensity of light used therein is $\frac{1}{12}$ of that in the entire time divisions S1-S4). Moreover, although, in the time division S2, red light among the light components emitted from the light source lamp 81 passes through the color wheel 83 and is used, the other color light components are wasted (the intensity of light used therein is $\frac{1}{12}$ of that in the entire time divisions S1-S4). Furthermore, although, in the time division S3, green light among light components emitted from the light source lamp 81 passes through the color wheel 83 and is used, the other color light components are wasted (the intensity of light used therein is $\frac{1}{12}$ of that in the entire time divisions S1-S4). Thus, in the above projector apparatus 80, the usage efficiency of light is extremely low, that is, as low as $\frac{1}{2}$ ($\frac{1}{4}+\frac{1}{12}+\frac{1}{12}+\frac{1}{12}$), and it is difficult to configure the structure of a projector apparatus capable of obtaining high illuminance with low electric power.

(2) Generally, in such a projector apparatus which projects a full color image, the brightness of each primary color light is controlled by changing the reflex time of the light (or the transmission time if a transmission type space modulation element is used) with respect to a space modulation element, wherein the number of gradation levels of each primary color light is 256 (8 bits), so that it becomes possible to reproduce color with gradation levels of the third power of 256 (16,777, 216). And in order to realize higher color reproduction quality, an increase of the number of gradation levels of each primary color light is required. However, it is difficult to increase the number of gradation levels because of the response speed of the space modulation element 86 in the above projector apparatus. In more detail, in the projector apparatus, the projection time for forming one frame of an image to be displayed is, for example, $\frac{1}{60}$ second (60 frames per second). And in order to realize the 256 gradation levels in each primary color light, it is required that the space modulation element 86 be operated 256 times in each of the time divisions S1-S3 where respective primary color lights are projected within the projection time of a frame, the response time required for the space modulation element 86 is 1/(60× 4×256) second (16.2 microseconds). And since the minimum response speed of known space modulation elements is approximately 15 microseconds even when a digital micro-mirror device is used as the space modulation element 86, the number of gradation levels cannot be increased, so that it is difficult to obtain higher color reproduction quality.

SUMMARY OF THE INVENTION

The present invention is made in view of the above background, and it is an object of the present invention to offer a light source device for a projector in which the usage efficiency of light is high, and it is possible to obtain an image with high color reproduction quality.

A light source device for a projector according to the present invention, comprises: a first color light source unit configured to form and emit a first division color light $X^1$ by directing a color light X along an optical path xI and a second division color light $X^2$ by directing a color light X along an optical path xII; a second color light source unit configured to form and emit a first division color light $Y^1$ by directing a color light Y along an optical path yI and a second division color light $Y^2$ by directing a color light Y along an optical path yII; a third color light source unit configured to form and emit a first division color light $Z^1$ by directing a color light Z along an optical path zI and a second division color light $Z^2$ by directing a color light Z along an optical path zII; a first color synthesizing optical element configured to synthesize light from the optical path xI, the optical path yI, and the optical path zI into a first synthesized light and emit the first synthesized light; a second color synthesizing optical element configured to synthesize light from the optical path xII, the optical path yII, and the optical path zII into a second synthesized light and emit the second synthesized light; a first spatial modulation element configured to receive the first synthesized light and emit a first light image; a second spatial modulation element configured to receive the second synthesized light and emit a second light image, the second spatial modulation element being driven in conjunction with the first spatial modulation element; an optical image synthesizing mechanism configured to synthesize the first light image and the second light image into a synthesized light image and to emit the synthesized light image; and a synthesized light image projection element configured to project the synthesized light image.

In the light source device for a projector according to the present invention, the first color light source unit may include a first laser light source which emits the color light X, and a first optical path switching element, which changes an optical path of the color light X emitted from the first laser light source. The second color light source unit may include a second laser light source which emits the color light Y, and a second optical path switching element which changes an optical path of the color light Y emitted from the second laser light source. The third color light source unit may include a third laser light source, which emits the color light Z, and a third optical path switching element which changes an optical path of the color light Z emitted from the third laser light source. The optical image synthesizing mechanism may comprise a color wheel.

Moreover, in the light source device for a projector according to the present invention, each of the division color lights may be p-wave linear polarization light or an s-wave linear polarization light. The optical image synthesizing mechanism may contain a polarization beam splitter. The light source device may further contain a retardation plate that is arranged on either one of the optical path from the first color synthesizing optical element to the optical image synthesizing mechanism or the optical path from the second color synthesizing optical element to the optical image synthesizing mechanism and is configured to change a kind of the linear polarization of light passing through the retardation plate.

In the light source device for a projector according to the present invention, preferably, each frame of an image to be displayed is divided into six time periods S1 through S6 which sequentially continue in terms of time; the first division color light $X^1$ enters the first spatial modulation element in the time periods S1 and S2 of each frame; the first division color light $Y^1$ enters the first spatial modulation element in the time periods S3 and S4 of each frame; the first division color light $Z^1$ enters the first spatial modulation element in the time periods S5 and S6 of each frame; the second division color light $Y^2$ enters the second spatial modulation element in the time periods S1 and S6 of each frame; the second division color light $Z^2$ enters the second spatial modulation element in the time periods S2 and S3 of each frame; and the second division color light $X^2$ enters the second spatial modulation element in the time periods S4 and S5 of each frame.

In such a light source device for a projector, preferably the first color light source unit forms the first division color light $X^1$ in the time periods S1 and S2 of each frame, is not operated in the time period S3 of each frame, forms the second division color light $X^2$ in the time periods S4 an S5 of each frame, and is not operated in the time period S6 of each frame; the second color light source unit forms the second division color light $Y^2$ in the time period S1 of each frame, is not operated in the time period S2 of each frame, forms the first division color light $Y^1$ in the time periods S3 and S4 of each frame, is not operated in the time period S5 of each frame, and forms the second division color light $Y^2$ in the time period S6 of each frame; and the third color light source unit is not operated in the time period S1 of each frame, forms the second division color light $Z^2$ in the time periods S2 and S3 of each frame, is not operated in the time period S4 of each frame, and forms the first division color light $Z^1$ in the time periods S5 and S6 of each frame.

Alternatively, in such a light source device for a projector the first color light source unit forms the first division color light $X^1$ in the time periods S1, S2 and S3 of each frame, and forms the second division color light $X^2$ in the time periods S4, S5 and S6 of each frame; the second color light source unit forms the second division color light $Y^2$ in the time periods S1, S2 and S6 of each frame, and forms the first division color light $Y^1$ in the time periods S3, S4 and S5; and the third color light source unit forms the first division color light $Z^1$ in the time periods S1, S5 and S6 of each frame, and forms the second division color light $Z^2$ in the time periods S2, S3 and S4

According to the light source device for a projector of the present invention, since in each of the time periods of each frame of an image to be displayed two or more of the color light X, the color light Y and the color light Z, which are three primary color lights, can be projected simultaneously, the high light usage efficiency can be obtained. Moreover, each of the color light X, the color light Y and the color light Z is divided into two in terms of time so that synthesized light of one group of division color lights enters the first spatial modulation element, synthesized light of the other group of division color lights enters the second spatial modulation element, whereby it becomes possible to control gradation of each color light in each of the first spatial modulation element and the second spatial modulation element, so that the gradation of each color light can be increased substantially, and an image, which has high color reproduction quality, can be obtained by synthesizing a first light image emitted from the first spatial modulation element and a second light image emitted from the second spatial modulation element.

BRIEF DESCRIPTION OF THE DRAWING

Other features and advantages of the present light source device will be apparent from the ensuing description, taken in conjunction with the accompanying drawings, in which:

FIG. 2 is a diagram showing an example of the relation of an operation of each laser light source unit, an optical path selected by each optical path switching element, light incident on each spatial modulation element and color light of a synthesized light image, in the light source device for a projector shown in FIG. 1, in the case where two of color light X, color light Y, and color light Z are simultaneously projected;

FIG. 3 is a diagram showing an example of the relation of an operation of each laser light source unit, an optical path selected by an optical path switching element, light incident on each spatial modulation element and color light of a synthesized light image, in the light source device for a projector shown in FIG. 1, in the case where three color lights, that is, color light X, color light Y, and color light Z, are simultaneously projected;

FIG. 6 is a diagram showing an example of the relation of an operation of each laser light source unit, an optical path selected by each optical path switching element, light incident on each spatial modulation element, an operation of a color wheel and color light of a synthesized light image, in the light source device for a projector shown in FIG. 4;

FIG. 8 is a diagram showing the relation between an operation of a color wheel and light incident on each space modulation element, in a light source device for a projectors of prior art.

DETAILED DESCRIPTION OF THE INVENTION

Embodiments of a light source device for a projector according to the present invention will be described below.

First Embodiment

Figure 1:
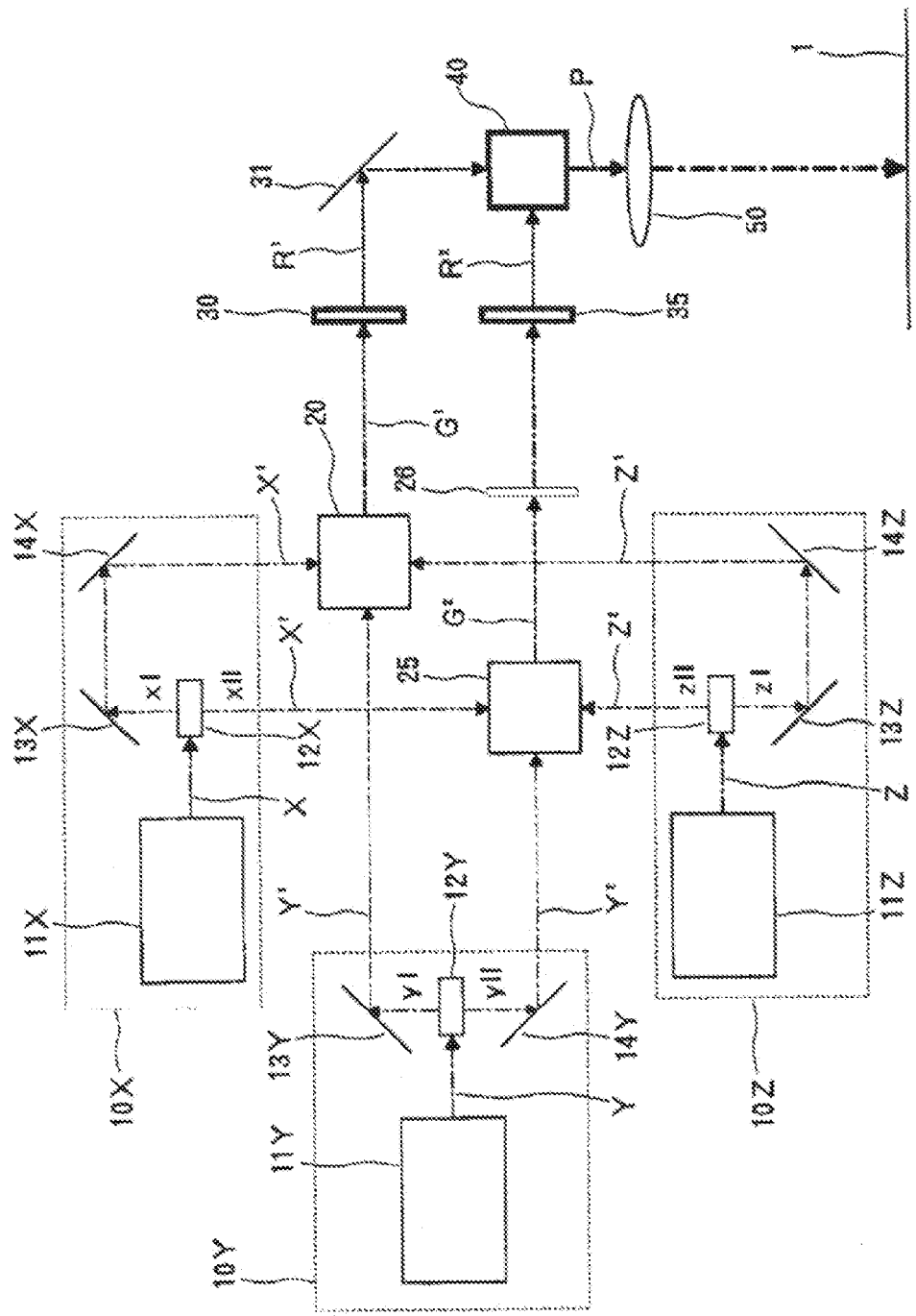
FIG. 1 is an explanatory diagram showing the structure of a light source device for a projector according to an embodiment of the present invention.

FIG. 1 is an explanatory diagram showing the structure of a light source device for a projector according to the first embodiment of the present invention. The light source device for a projector comprises a first color light source unit 10X for emitting first division color light $X^1$ and second division color light $X^2$, which are formed by changing the optical path of color light X, during specified periods of time, to either optical path xI or optical path xII, respectively; a second color light source unit 10Y for emitting first division color light $Y^1$ and second division color light $Y^2$, which are formed by changing the optical path of color light Y, during specified periods of time, to either optical path yI or optical path yII, respectively; and a third color light source unit 10Z for emitting first division color light $Z^1$, and second division color light $Z^2$, which are formed by changing the optical path of color light Z, during specified periods of time, to either optical path zI or optical path zII, respectively. Here, the color light X, the color light Y, and the color light Z are primary color lights, which are different from one another. That is, one of red light, green light and blue light is the color light X, another color light is the color light Y, and the remaining color light is the color light Z.

The first color light source unit 10X comprises a first laser light source 11X, which emits the color light X (for example red light); a first optical path switching element 12X, which forms the first division color light $X^1$ and the second division color light $X^2$ by changing the optical path of the color light X emitted from the first laser light source 11X, during specified periods of time, and which switches and emits the first division color light $X^1$ and the second division color light $X^2$ to optical paths xI and xII, which are different from each other; and light reflectors 13X and 14X which reflect the first division color light $X^1$ from the first optical path switching element 12X. The second color light source unit 10Y comprises a second laser light source 11Y, which emits the color light Y (for example green light); a second optical path switching element 12Y, which forms the first division color light $Y^1$ and the second division color light $Y^2$ by changing the optical path of the color light Y emitted from the second laser light source 11Y, during specified periods of time, and which switches and emits the first division color light $Y^1$ and the second division color light $Y^2$ to optical paths yI and yII, which are different from each other; a light reflector 13Y, which reflects the first division color light $Y^1$ emitted from the second optical path switching element 12Y and a light reflector 14Y, which reflects the second division color light $Y^2$ emitted from the second optical path switching element 12Y. The third color light source unit 10Z comprises a third laser light source 11Z, which emits the color light Z (for example, blue light); a third optical path switching element 12Z, which forms the first division color light $Z^1$ and the second division color light $Z^2$ by changing the optical path of the color light Z emitted from the third laser light source 11Z, during specified periods of time, and which switches and emits the first division color light $Z^1$ and the second division color light $Z^2$ to optical paths zI and zII, which are different from each other; and light reflector 13Z and 14Z, which reflect the first division color light $Z^1$ emitted from the third optical path switching element 12Z.

In the present light source device for a projector according to the first embodiment, laser light sources, which emit either p-wave linear polarization lights respectively or s-wave linear polarization lights respectively, are used for the first laser light source 11X, the second laser light source 11Y, and the third laser light source 11Z. Semiconductor laser device etc. can be used as a laser unit, which forms each of the first laser light source 11X, the second laser light source 11Y, and the third laser light source 11Z.

In view of reduction of light loss at the time when optical paths are switched, optical path switching elements having a response speed of 1 millisecond or less, specifically on the order of 0.1 millisecond, are preferably used as the first optical path switching element 12X, the second optical path switching element 12Y, and the third optical path switching element 12Z. For example, galvanometer mirrors, polygon mirrors, two-dimensional MEMS mirrors, etc. are used as the first optical path switching element 12X, the second optical path switching element 12Y, and the third optical path switching element 12Z.

A first color synthesizing optical element 20, which synthesizes the first division color light $X^1$, the first division color light $Y^1$, and the first division color light $Z^1$ thereby forming and emitting a first synthesized light $G^1$, is arranged at an intersection of the optical path xI of the first division color light $X^1$ emitted from the first color light source unit 10X, the optical path yI of the first division color light $Y^1$ emitted from the second color light source unit 10Y, and the optical path zI of the first division color light $Z^1$ emitted from the third color light source unit 10Z. A second color synthesizing optical element 25, which synthesizes the second division color light $X^2$, the second division color light $Y^2$, and the second division color light $Z^2$ thereby forming and emitting a second synthesized light $G^2$, is arranged at an intersection of the optical path xII of the second division color light $X^2$ emitted from the first color light source unit 10X, the optical path yII of the second division color light $Y^2$ emitted from the second color light source unit 10Y, and the optical path zII of the second division color light $Z^2$ emitted from the third color light source unit 10Z. Color synthesizing prisms such as dichroic prisms can be used as the first color synthesizing optical element 20 and the second color synthesizing optical element 25.

A first transmission type spatial modulation element 30, on which the first synthesized light $G^1$ is incident, and which emits the first light image $R^1$, is arranged on the optical path of the first synthesized light $G^1$ emitted from the first color synthesizing optical element 20. A second transmission type spatial modulation element 35, on which the second synthesized light $G^2$ is incident, and which emits the second light image $R^2$, is arranged on the optical path of the second synthesized light $G^2$ emitted from the second color synthesizing optical element 25. Here, the second spatial modulation element 35 is driven in relation to the first spatial modulation element 30.

Moreover, an optical image synthesizing mechanism 40, which synthesizes the first light image $R^1$ and the second light image $R^2$, so as to form a synthesized light image P, and which is made up of a polarization beam splitter, is arranged at an intersection of the optical path of the first light image $R^1$ emitted from the first spatial modulation element 30, and the optical path of the second light image $R^2$ emitted from the second spatial modulation element 35. A synthesized light image projection element 50, which enlarges the synthesized light image P and projects it on a screen 1, and which is made up of a projection lens, is arranged on the optical path of the synthesized light image P emitted from the optical image synthesizing mechanism 40. Moreover, a retardation plate 26 is arranged on the optical path of the second synthesized light $G^2$ emitted from the second color synthesizing optical element 25, and between the second color synthesizing optical element 25 and the second spatial modulation element 35.

It is desirable that the response speed of the first spatial modulation element 30 and the second spatial modulation element 35 be 20 microsecond or less, so that the number of gradation levels of each of the color light X, the color light Y, and the color light Z may be set so as to be large in the first spatial modulation element 30 and the second spatial modulation element 35. For example, a Digital Micro-mirror Device (DMD), a liquid crystal display device, etc. may be used as the first spatial modulation element 30 and the second spatial modulation element 35.

The polarization beam splitter, which forms the optical image synthesizing mechanism 40, transmits specific linear polarization light, and reflects linear polarization light, whose kind is different from that of the specific linear polarization light. In an example shown in the drawings, the polarization beam splitter transmits linear polarization light relating to the first light image $R^1$, which enters the splitter through the light reflector 31 from the first spatial modulation element 30, and reflects, by 90 degrees, the linear polarization light relating to the second light image $R^2$, which enters the splitter from a direction perpendicular to the first light image $R^1$ and which is emitted from the second spatial modulation element 35, so that the synthesized light image P is formed.

The retardation plate 26 is a ½ wavelength plate by which a phase of incident light is changed by 180 degrees. When the second synthesized light $G^2$ enters this retardation plate 26, the kind of linear polarization of the second synthesized light $G^2$ is changed. Specifically, in case where the second synthesized light $G^2$ is s-wave linear polarization light, the light is changed into p-wave linear polarization light, and in case where the second synthesized light $G^2$ is p-wave linear polarization light, the light is changed into s-wave linear polarization light.

In the above-mentioned light source device for a projector, two or three of the color light X, the color light Y, and the color light Z can be simultaneously projected in each of the time divisions, which sequentially continue in terms of time, in each frame of an image to be displayed. An operation of the above mentioned light source device for a projector in case where two of the color light X, the color light Y, and the color light Z are simultaneously projected, will be described below.

Simultaneous Projection of Two Color Lights

FIG. 2 is a diagram showing an example of the relation of an operation of each laser light source unit (refer to "$1^{st}$ laser light source op.", "$2^{nd}$ laser light source op." and "$3^{rd}$ laser light source op."), an optical path selected by each optical path switching element (refer to "Optical path by $1^{st}$ OPSE", "Optical path by $2^{nd}$ OPSE" and "Optical path by 3rd OPSE"), light incident on each spatial modulation element (refer to "Incident light on $1^{st}$ S.M.E." and "Incident light on 2nd S.M.E."), and color light of a synthesized light image (refer to "Color image of Synthesized L.I."), in the light source device for a projector shown in FIG. 1, where two of color light X, color light Y, and color light Z are simultaneously projected. In this example, projection time of one frame of an image to be displayed is divided into six time divisions S1-S6, which sequentially continue in terms of time, and under this condition, the light source device for a projector is operated.

In the first color light source unit 10X, the operation of the first laser light source 11X is, in the time divisions S1, S2, S4, and S5, in an ON state where color light X is emitted, and is in an OFF state in the time divisions S3 and S6. The optical path selected by the first optical path switching element 12X is the optical path xI in the time divisions S1-S3, and it is the optical path xII in the time divisions S4-S6. The first color light source unit 10X forms and emits the first division color light $X^1$ in the time divisions S1 and S2, and is not operated in the time division S3, and forms and emits the second division color light $X^2$ in the time divisions S4 and S5, and is not operated in the time division S6.

In the second color light source unit 10Y, an operation of the second laser light source 11Y is, in the time divisions S1, S3, S4 and S6, in an ON state where the color light Y is emitted, and is in an OFF state in the time divisions S2 and S5. The optical path selected by the second optical path switching element 12Y is the optical path yI in the time divisions S3-S5, and it is the optical path yII in the time divisions S1, S2 and S6. As a result, the second color light source unit 10Y forms and emits the second division color light $Y^2$ in the time division S1, and is not operated in the time division S2, and forms and emits the first division color light $Y^1$ in the time divisions S3 and S4, is not operated in the time division S5, and again forms and emits the second division color light $Y^2$ in the time division S6.

In the third color light source unit 10Z, an operation of the third laser light source 11Z is, in the time divisions S2, S3, S5 and S6, in an ON state where color light Z is emitted, and is in an OFF state in the time divisions S1 and S4. The optical path selected by the third optical path switching element 12Z is the optical path zI in the time divisions S1, S5 and S6, and it is the optical path zII in the time divisions S2-S4. The third color light source unit 10Z is not operated in the time division S1, forms and emits the second division color light $Z^2$ in the time divisions S2 and S3, is not operated in the time division S4, and forms and emits the first division color light $Z^1$ in the time divisions S5 and S6.

Moreover, when the first division color light $X^1$, the first division color light $Y^1$ and the first division color light $Z^1$ are synthesized in the first color synthesizing optical element 20, the first synthesized light $G^1$ is emitted from the first color synthesizing optical element 20 and enters the first spatial modulation element 30. The light incident on the first spatial modulation element 30 (first synthesized light $G^1$) in the time divisions S1 and S2 is the color light X, the incident light $G^1$ in the time divisions S3 and S4 is the color light Y, and the incident light $G^1$ in the time divisions S5 and S6 is the color light Z. On the other hand, when the second division color light $X^2$, the second division color light Y and the second division color light $Z^2$ are synthesized in the second color synthesizing optical element 25, the second synthesized light $G^2$ is emitted from the second color synthesizing optical element 25 and enters the second spatial modulation element 35 through the retardation plate 26. The light incident on the second spatial modulation element 35 (second synthesized light $G^2$) in the time division S1 is the color light Y, the incident light $G^2$ in the time divisions S2 and S3 is the color light Z, the incident light $G^2$ in the time divisions S4 and S5 is the color light X, and the incident light in the time division S6 is the color light Y.

And when the first light image $R^1$ from the first spatial modulation element 30 and the second light image $R^2$ from the second spatial modulation element 35 are synthesized in the optical image synthesizing mechanism 40, the synthesized light image P is emitted from the optical image synthesizing mechanism 40 and enlarged by the synthesized light image projection element 50, so as to be projected on a screen 1. If this synthesized light image P is divided based on the time divisions S1-S6, the color lights in the time divisions S1 and S4 are two color lights, that is, the color light X and the color light Y, the color lights in the time division S2 and S5 are two color lights, that is, the color light X and the color light Z, and the color lights in the time division S3 and S6 are two color lights, that is, the color light Y and the color light Z.

As mentioned above, in each of the six time divisions S1-S6, which sequentially continue in terms of time, in each frame of an image to be displayed, two of the color light X, the color light Y, and the color light Z are simultaneously projected. Moreover, in each of the first spatial modulation element 30 and the second spatial modulation element 35, the number of gradation levels can be set to 128 in each of the time divisions S1-S6. Therefore, the number of gradation levels of the color light X in each frame is 512, which is a sum of the gradation levels in the time divisions S1 and S2 in the first spatial modulation element 30 and the gradation levels in the time divisions S4 and S5 in the second spatial modulation element 35. Moreover, the number of gradation levels of the color light Y in each frame is 512, which is a sum of the gradation levels in the time divisions S3 and S4 in the first spatial modulation element 30 and the gradation levels in the time divisions S1 and S6 in the second spatial modulation element 35. Moreover, the number of gradation levels of the color light Z in each frame is 512, which is a sum of gradation levels in the time divisions S5 and S6 in the first spatial modulation element 30, and the gradation levels in the time divisions S2 and S3 in the second spatial modulation element 35.

Simultaneous Projection of Three Color Lights

FIG. 3 is a diagram showing an example of relation of an operation of each laser light source unit (refer to "$1^{st}$ laser light source op.", "2nd laser light source op." and "3rd laser light source op."), an optical path selected by each optical path switching element (refer to "Optical path by $1^{st}$ OPSE", "Optical path by 2nd OPSE" and "Optical path by 3rd OPSE"), light incident on each spatial modulation element (refer to "Incident light on $1^{st}$ S.M.E." and "Incident light on 2nd S.M.E.") and color light of a synthesized light image (refer to "C. L. of synthesized L.I."), in the light source device for a projector shown in FIG. 1, in the case where three color lights, that is, color light X, color light Y, and color light Z, are simultaneously projected. In this example, projection time of one frame of an image to be displayed is divided into six time divisions S1-S6, which sequentially continue in terms of time, and under this condition, the light source device for a projector is operated.

In the first color light source unit 10X, in all the time divisions S1-S6, an operation of the first laser light source 11X is in an ON state where color light X is emitted. The optical path selected by the first optical path switching element 12X is the optical path xI in the time divisions S1-S3, and it is the optical path xII in the time divisions S4-S6. The first color light source unit 10X forms and emits the first division color light $X^1$ in the time divisions S1-S3, and forms and emits the second division color light $X^2$ in the time divisions S4-S6.

In the second color light source unit 10Y, in all the time divisions S1-S6, an operation of the second laser light source 11Y is in an ON state where color light Y is emitted. The optical path selected by the second optical path switching element 12Y is the optical path yI in the time divisions S3-S5, and it is the optical path yII in the time divisions S1, S2 and S6. As a result, the second color light source unit 10Y forms and emits the second division color light $Y^2$ in the time divisions S1 and S2, forms and emits the first division color light $Y^1$ in the time divisions S3-S5, and again forms and emits the second division color light $Y^2$ in the time division S6.

In the third color light source unit 10Z, in all the time divisions S1-S6, an operation of the third laser light source 11Z is in an ON state where color light Z is emitted. The optical path by the third optical path switching element 12Z is the optical path zI in the time divisions S1, S5 and S6, and it is the optical path zII in the time divisions S2-S4. As a result, the third color light source unit 10Z forms and emits the first division color light $Z^1$ in the time division S1, forms and emits the second division color light $Z^2$ in the time divisions S2-S4, and again forms and emits the first division color light $Z^1$ in the time divisions S5 and S6.

Moreover, when the first division color light X', the first division color light $Y^1$ and the first division color light $Z^1$ are synthesized in the first color synthesizing optical element 20, a first synthesized light $G^1$ is emitted from the first color synthesizing optical element 20 and enters the first spatial modulation element 30. The light incident on the first spatial modulation element 30 (first synthesized light $G^1$) in the time division S1 is a mixed light XZ, which is a mixture of the color light X and the color light Z, the incident light $G^1$ in the time division S2 is the color light X, the incident light $G^1$ in the time division S3 is a mixed light XY, which is a mixture of the color light X and the color light Y, the incident light $G^1$ in the time division S4 is the color light Y, the incident light $G^1$ in the time division S5 is a mixed light YZ, which is a mixture of the color light Y and the color light Z, and the incident light $G^1$ in the time division S6 is the color light Z. On the other hand, since the second division color light $X^2$, the second division color light $Y^2$ and the second division color light $Z^2$ are synthesized in the second color synthesizing optical element 25, a second synthesized light $G^2$ is emitted from the second color synthesizing optical element 25 and enters the second spatial modulation element 35 through the retardation plate 26. The light incident on the second spatial modulation element 35 (second synthesized light $G^2$) in the time division S1 is the color light Y, the incident light $G^2$ in the time division S2 is a mixed light YZ, which is a mixture of the color light Y and the color light Z, the incident light $G^2$ in the time division S3 is the color light Z, the incident light $G^2$ in the time division S4 is a mixed light XZ, which is a mixture of the color light X and the color light Z, the incident light $G^2$ in the time division S5 is the color light X, and the incident light $G^2$ in the time division S6 is a mixed light XY, which is a mixture of the color light X and the color light Y.

And when the first light image $R^1$ emitted from the first spatial modulation element 30 and the second light image $R^2$ emitted from the second spatial modulation element 35 are synthesized in the optical image synthesizing mechanism 40, a synthesized light image P is emitted from the optical image synthesizing mechanism 40 and enlarged by the synthesized light image projection element 50, so as to be projected on the screen 1. In each of the time divisions S1-S6, the synthesized light image P consists of three color lights, that is, the color light X, the color light Y and the color light Z. As mentioned above, in each of the six time divisions S1-S6, which sequentially continue in terms of time, in each frame of an image to be displayed, three color lights, that is, the color light X, the color light Y, and the color light Z are simultaneously projected.

Moreover, in each of the first spatial modulation element 30 and the second spatial modulation element 35, the number of gradation levels can be set to 128 in each of the time divisions S1-S6. Therefore, the number of gradation levels of the color light X is 256, which is a sum of 128 gradation levels in the time division S2 in the first spatial modulation element 30, and 128 gradation levels in the time division S5 in the second spatial modulation element 35. However, gradation of the mixed light containing color light X as a component can also be set to 128 gradation levels in each of their respective time divisions such that the effective gradation levels of the color light X in one frame is set to 768 substantially: gradation of the mixed light XZ can be set (to 128 gradation levels) in the time division S1 and that of the mixed light XY can be set (to 128 gradation levels) in the time division S3 in the first spatial modulation element 30, gradation of the mixed light XZ can be set (to 128 gradation levels) in the time division S4 and gradation of the mixed light XY can be set (to 128 gradation levels) in the time division S6 in the second spatial modulation element 35. The number of gradation levels of the color light Y is 256, which is a sum of 128 gradation levels in the time division S4 in the first spatial modulation element 30, and 128 gradation levels in the time division S1 in the second spatial modulation element 35. However, gradation of the mixed light containing color light Y as a component can also be set to 128 gradation levels in each of their respective time divisions such that the effective gradation levels of the color light Y in one frame is set to 768 substantially: gradation of the mixed light XY can be set (to 128 gradation levels) in the time division S3 and gradation of the mixed light YZ can be set (to 128 gradation levels) in the time division S5 in the first spatial modulation element 30, gradation of the mixed light YZ can be set (to 128 gradation levels) in the time division S2 and gradation of the mixed light XY can be set (to 128 gradation levels) in the time division S6 in the second spatial modulation element 35. In addition, the number of gradation levels of the color light Z is 256, which is a sum of 128 gradation levels in the time division S6 in the first spatial modulation element 30, and 128 gradation levels in the time division S3 in the second spatial modulation element 35. However, gradation of the mixed light containing color light Z as a component can also be set to 128 gradation levels in each of their respective time divisions such that the effective gradation levels of the color light Z in one frame is set to 768 substantially: gradation of the mixed light XZ can be set (to 128 gradation levels) in the time division S1 and gradation of the mixed light YZ can be set (to 128 gradation levels) in the time division S5 by the first spatial modulation element 30, gradation of the mixed light YZ can be set (to 128 gradation levels) in the time division S2 and gradation of the mixed light XZ can be set (to 128 gradation levels) in the time division S4 in the second spatial modulation element 35.

According to the above-mentioned light source device for a projector, because two or more of three primary color lights, that is, the color light X, the color light Y and the color light Z, can be projected simultaneously in each of the six time divisions S1-S6, which sequentially continue in terms of time, in each frame of an image to be displayed, high light usage efficiency can be obtained. Moreover, in the first color light source 10X, the second color light source 10Y and the third color light source 10Z, each of the color light X, the color light Y and the color light Z is divided into two in terms of time, and while the first synthesized light $G^1$ formed by synthesizing one group of division color lights enters the first spatial modulation element 30, the second synthesized light $G^2$ formed by synthesizing the other group of division color lights enters the second spatial modulation element 35. Therefore, because the gradation of each color light can be controlled in each of the first spatial modulation element 30 and the second spatial modulation element 35, it becomes possible to increase substantially the number of gradation levels of each color light in each frame, and an image that has high color reproduction quality can be obtained by synthesizing the first light image $R^1$ emitted from the first spatial modulation element 30 and the second light image $R^2$ emitted from the second spatial modulation element 35.

Second Embodiment

Figure 4:
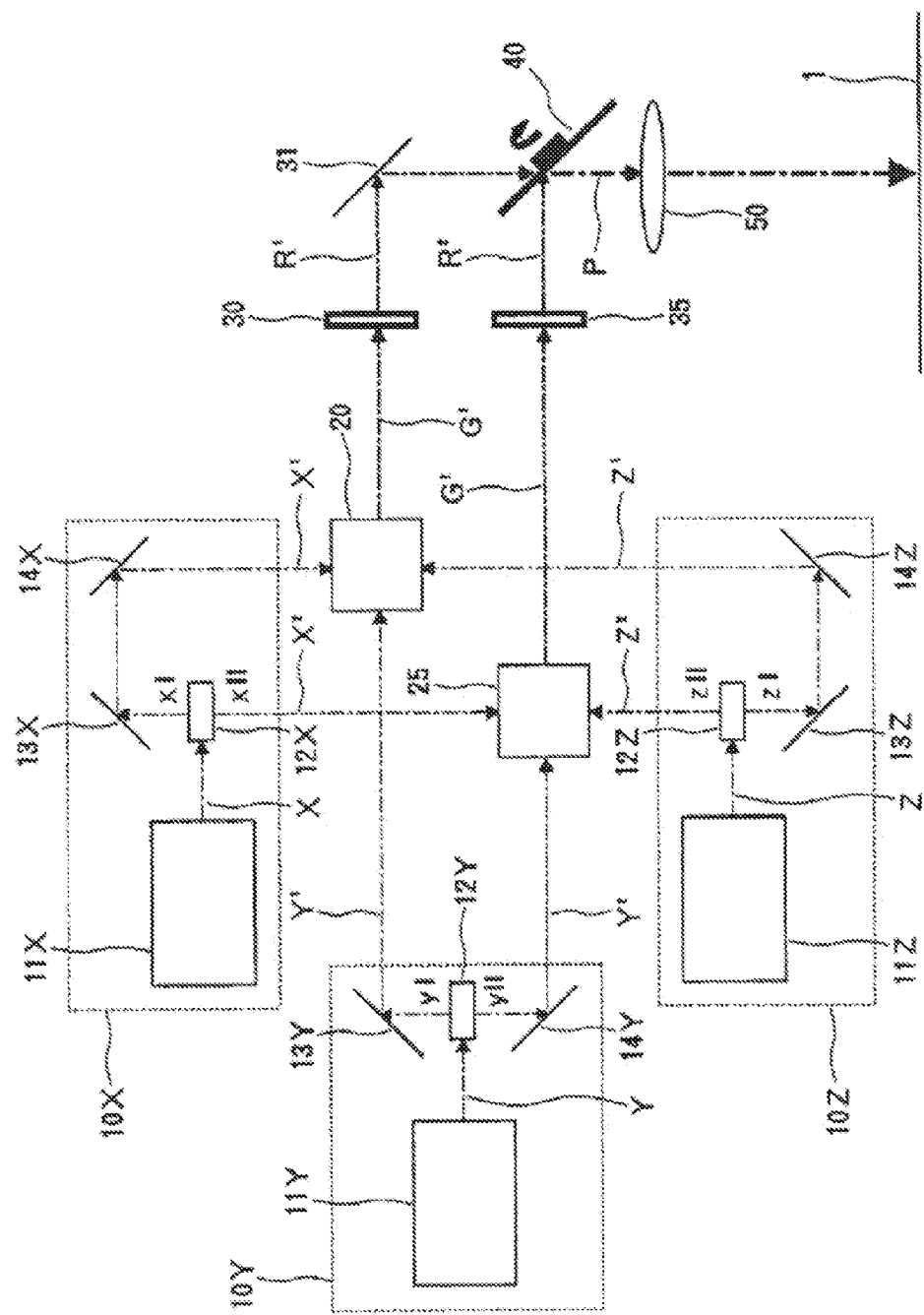
FIG. 4 is an explanatory diagram showing the structure of a light source device for a projector according to a second embodiment of the present invention.

FIG. 4 is an explanatory diagram showing the structure of a light source device for a projector according to a second embodiment of the present invention. This light source device for a projector is the same as that according to the first embodiment of the present invention, except that each of a first laser light source 11X, a second laser light source 11Y, and a third laser light source 11Z emits unpolarized light, a retardation plate 26 is not provided, and an optical image synthesizing mechanism 40 is made up of a color wheel that is driven to rotate.

Figure 5:
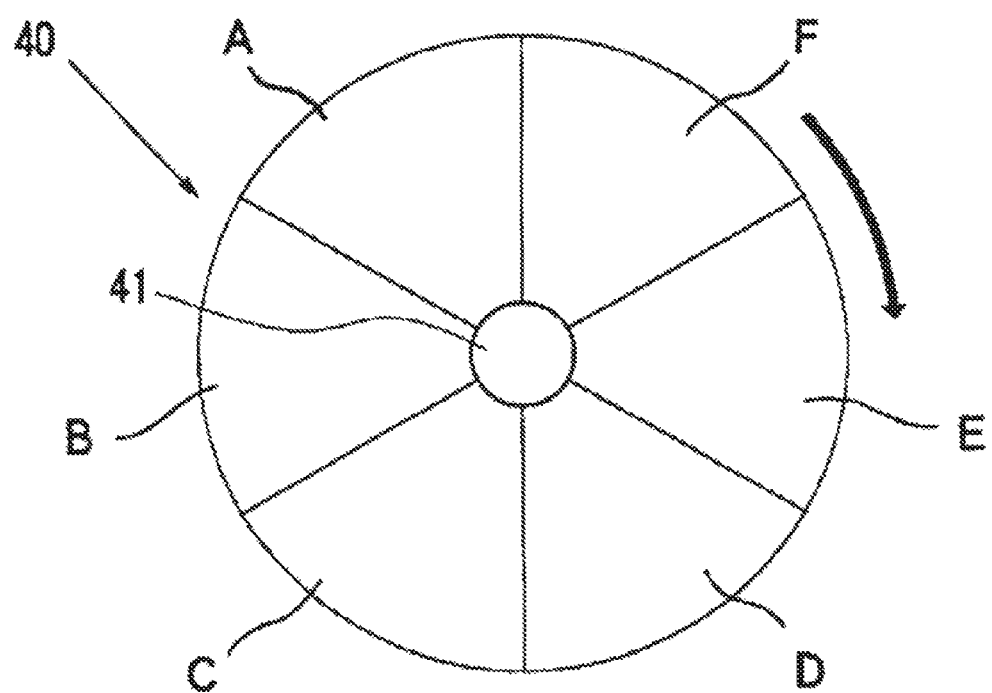
FIG. 5 is a plan view of a color wheel which forms an optical image synthesizing mechanism.
Figure 7:
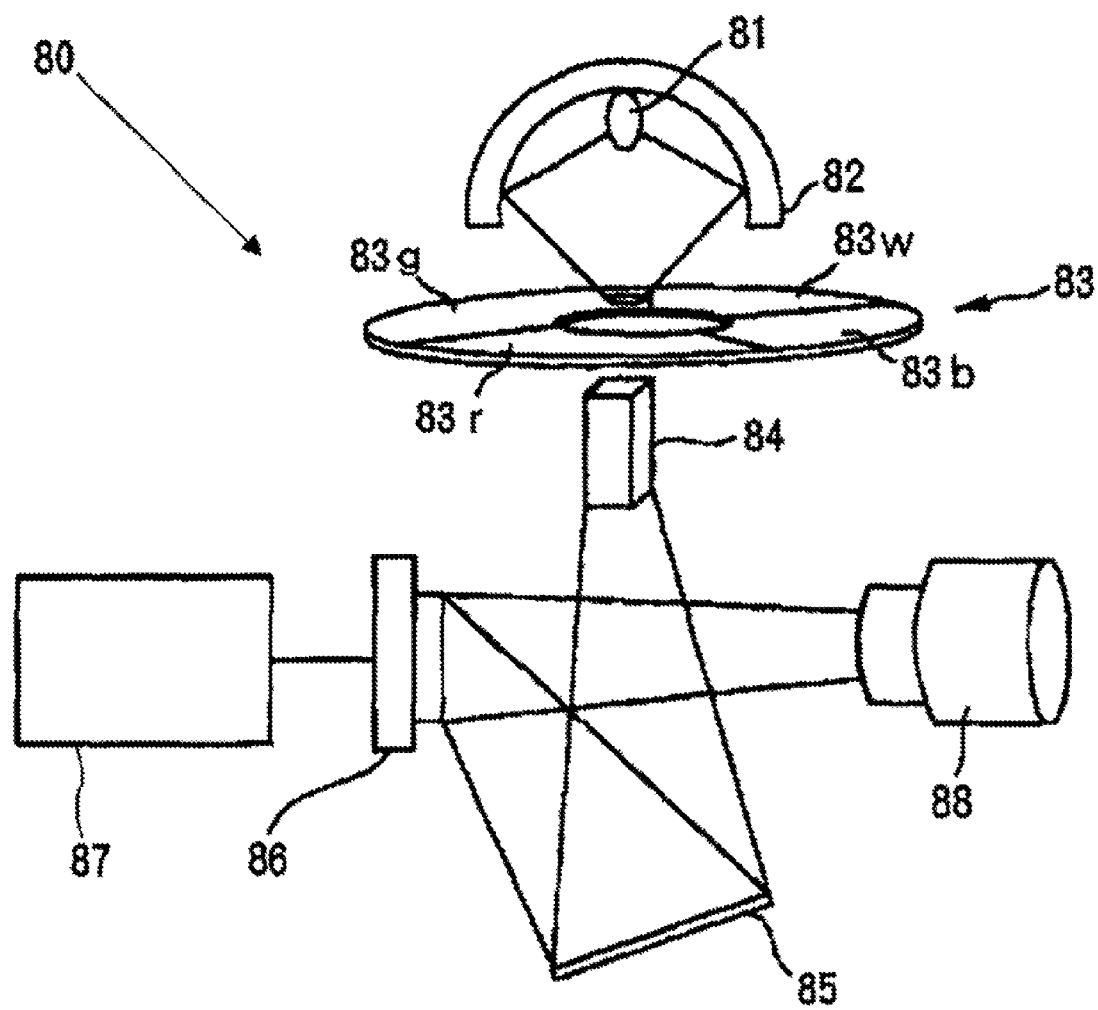
FIG. 7 is an explanatory diagram showing the structure of an example of a color sequential display type projector apparatus according to prior art.

As shown in FIG. 5, the color wheel, which forms the optical image synthesizing mechanism 40, comprises six filter elements A, B, C, D, E and F, each of which has a shape of a partial sector, and these filter elements are arranged in this order so as to form an annular shape on the same plane. The color wheel is arranged so as to be inclined at 45 degrees with respect to the optical path of the first light image $R^1$ emitted from the first spatial modulation element 30 and the second light image $R^2$ emitted from the second spatial modulation element 35. When this color wheel is driven to rotate in a clockwise direction as shown by the arrow in FIG. 5, the six filter elements A, B, C, D, E, and F are controlled so as to pass, one by one, through an intersection of the optical path of the first light image $R^1$ emitted from the first spatial modulation element 30, and the optical path of the second light image $R^2$ emitted from the second spatial modulation element 35.

For example, the filter element A of the color wheel has the optical characteristics of transmitting the color light X and reflecting the color light Y. The filter element B thereof has the optical characteristics of transmitting the color light X and reflecting the color light Z. The filter element C thereof has the optical characteristics of transmitting the color light Y and reflecting the color light Z. The filter element D thereof has the optical characteristics of transmitting the color light Y and reflecting the color light X. The filter element E thereof has the optical characteristics of transmitting the color light Z and reflecting the color light X. The filter element F thereof has the optical characteristics of transmitting the color light Z and reflecting the color light Y. Elements made from dielectric multilayers can be used as the filter elements A, B, C D, E, and F.

According to the above mentioned light source device for a projector, in each of the time divisions S1-S6, which sequentially continue in terms of time, in each frame of an image to be displayed, two of the color light X, the color light Y, and the color light Z are simultaneously projected.

FIG. 6 is a diagram showing an example of the relation of an operation of each laser light source unit (refer to "1$^{st}$ laser light source op.", "2nd laser light source op." and "3rd laser light source op."), an optical path selected by each optical path switching element, light incident on each spatial modulation element (refer to "Optical path by 1$^{st}$ OPSE", "Optical path by 2nd OPSE" and "Optical path by 3rd OPSE"), incident light on each spatial modulation element (refer to "Incident light on 1$^{st}$ S.M.E." and "Incident light on 2nd S.M.E."), an operation of a color wheel and color light of a synthesized light image (refer to "C. L. of synthesized L.I."), in the light source device for a projector shown in FIG. 4. In this example, projection time of one frame of an image to be displayed is divided into six time divisions S1-S6, which sequentially continue in terms of time, and under this condition, the light source device for a projector is operated.

In the first color light source unit 10X, while in the time divisions S1, S2, S4 and S5, an operation of the first laser light source 11X is in an ON state where color light X is emitted, and it is in an OFF state in the time division S3 and S6. The optical path selected by the first optical path switching element 12X is the optical path xI in the time divisions S1-S3, and it is the optical path xII in the time divisions S4-S6. Thereby, the first color light source unit 10X forms and emits the first division color light $X^1$ in the time divisions S1 and S2, is not operated in the time division S3, forms and emits the second division color light $X^2$ in the time divisions S4 and S5, and is not operated in the time division S6.

In the second color light source unit 10Y, an operation of the second laser light source 11Y is in an ON state in the time divisions S1, S3, S4 and S6, and is in an OFF state in the time divisions S2 and S5. The optical path selected by the second optical path switching element 12Y is the optical path yI in the time divisions S3-S5, and it is the optical path yII in the time divisions S1, S2 and S6. As a result, the second color light source unit 10Y forms and emits the second division color light $Y^2$ in the time division S1, is not operated in the time division S2, forms and emits the first division color light $Y^1$ in the time divisions S3 and S4, is not operated in the second time division S5, and again forms and emits the second division color light $Y^2$ in the time division S6.

In the third color light source unit 10Z, an operation of the third laser light source 11Z is in an ON state in the time divisions S2, S3, S5 and S6, and is in an OFF state in the time divisions S1 and S4. The optical path selected by the third optical path switching element 12Z is the optical path zI in the time divisions S1, S5 and S6, and it is the optical path zII in the time divisions S2-S4. As a result, the third color light source unit 10Z is not operated in the time division S1, forms and emits the second division color light $Z^2$ in the time divisions S2 and S3, is not operated in the time division S4, forms and emits the first division color light $Z^1$ in the time divisions S5-S6.

Moreover, since the first division color light $X^1$, the first division color light $Y^1$ and the first division color light $Z^1$ are synthesized in the first color synthesizing optical element 20, a first synthesized light $G^1$ is emitted from the first color synthesizing optical element 20 and enters the first spatial modulation element 30. The light (first synthesized light $G^1$), which is incident on the first spatial modulation element 30 in the time divisions S1 and S2 is color light X, the incident light $G^1$ in the time divisions S3 and S4 is the color light Y, and the incident light $G^1$ in the time divisions S5 and S6 is color light Z. On the other hand, when the second division color light $X^2$, the second division color light $Y^2$ and the second division color light $Z^2$ are synthesized in the second color synthesizing optical element 25, a second synthesized light $G^2$ is emitted from the second color synthesizing optical element 25 and enters the second spatial modulation element 35. The light (second synthesized light $G^2$), which is incident on the second spatial modulation element 35 in the time division S1 is the color light Y, the incident light $G^2$ in the time divisions S2 and S3 is color light Z, the incident light $G^2$ in the time divisions S4 and S5 is the color light X, and the incident light $G^2$ in the time division S6 is color light Y.

And when the first light image $R^1$ emitted from the first spatial modulation element 30 and the second light image $R^2$ emitted from the second spatial modulation element 35 are synthesized in the optical image synthesizing mechanism 40, a synthesized light image P is emitted from the optical image synthesizing mechanism 40 and enlarged by the synthesized light image projection element 50, so as to be projected on the screen 1.

Specifically, when the color wheel which forms the optical image synthesizing mechanism 40 is driven to rotate, the filter element A passes through an intersection of the optical path of the first light image $R^1$ emitted from the first spatial modulation element 30 and the optical path of the second light image $R^2$ emitted from the second spatial modulation element 35 (hereinafter referred to as "an optical image synthesizing intersection") in the time division S1, the filter element B passes through the optical image synthesizing intersection in the time division S2, the filter element C passes through the optical image synthesizing intersection in the time division S3, the filter element D passes through the optical image synthesizing intersection in the time division S4, the filter element E passes through the optical image synthesizing intersection in the time division S5, and the filter element F passes through the optical image synthesizing intersection in the time division S6.

And while the color light X, which forms the first light image $R^1$ passes through the filter element A in the time division S1, the color light Y, which forms the second light image $R^2$, is reflected by the filter element A. While the color light X, which forms the first light image $R^1$, passes through the filter element B in the time division S2, the color light Z, which forms the second light image $R^2$, is reflected by the filter element B. While the color light Y, which forms the first light image $R^1$, passes through the filter element C in the time division S3, the color light Z, which forms the second light image $R^2$, is reflected by the filter element C. While the color light Y, which forms the first light image $R^1$, passes through the filter element D in the time division S4, the color light X, which forms the second light image $R^2$, is reflected by the filter element D. While the color light Z, which forms the first light image $R^1$, passes through the filter element E in the time division S5, the color light X, which forms the second light image $R^2$, is reflected by the filter element E. While the color light Z, which forms the first light image $R^1$, passes through the filter element F in the time division S4, the color light Y, which forms the second light image $R^2$, is reflected by the filter element F.

The synthesized light image P emitted from the optical image synthesizing mechanism 40 consists of the following: the color lights in the time divisions S1 and S4 are two color lights, that is, the color light X and the color light Y, the color lights in the time division S2 and S5 are two color lights, that is, the color light X and the color light Z, and the color lights in the time division S3 and S6 are two color lights, that is, the color light Y and the color light Z. As mentioned above, in each of the six time divisions S1-S6, which sequentially continue in terms of time, in each frame of an image to be displayed, two of the color light X, the color light Y, and the color light Z are simultaneously projected.

Moreover, in each of the first spatial modulation element 30 and the second spatial modulation element 35, the number of gradation levels can be set to 128 in each of the time divisions S1-S6. Therefore, the number of gradation levels of the color light X is 512, which is a sum of the gradation levels in the time divisions S1 and S2 in the first spatial modulation element 30, and the gradation levels in the time divisions S4 and S5 in the second spatial modulation element 35. In addition, the number of gradation levels of the color light Y is 512, which is a sum of the gradation levels in the time divisions S3 and S4 in the first spatial modulation element 30, and the gradation levels in the time divisions S1 and S6 in the second spatial modulation element 35. Moreover, the number of gradation levels of the color light Z is 512, which is a sum of the gradation levels in the time divisions S5 and S6 in the first spatial modulation element 30, and the gradation levels in the time divisions S2 and S3 in the second spatial modulation element 35.

According to the above-mentioned light source device for a projector, because two or more of three primary color lights, that is, the color light X, the color light Y and the color light Z, can be projected at the same time in each of the six time divisions S1-S6, which sequentially continue in terms of time, in each frame of an image to be displayed, high light usage efficiency can be obtained. Moreover, in each of the first color light source 10X, the second color light source 10Y and the third color light source 10Z, each of the color light X, the color light Y and the color light Z is divided into two in terms of time, and while the first synthesized light $G^1$ formed by synthesizing one group of division color lights enters the first spatial modulation element 30, the second synthesized light $G^2$ formed by synthesizing the other group of division color lights enters the second spatial modulation element 35. Therefore, because it is possible to control the gradation of each color light in each of the first spatial modulation element 30 and the second spatial modulation element 35, it becomes possible to substantially increase the number of gradation levels of each color light in each frame, and an image that has high color reproduction quality can be obtained by synthesizing the first light image $R^1$ emitted from the first spatial modulation element 30 and the second light image $R^2$ emitted from the second spatial modulation element 35. Moreover, since the color wheel is used as the optical image synthesizing mechanism 40, it is not necessary to use linear polarization in order to synthesize the first light image $R^1$ and the second light image $R^2$. Therefore, since it becomes unnecessary to arrange a retardation plate, it is possible to reduce speckles with respect to an image to be projected.

Although the light source device for a projector according to the first and second embodiments of the present invention is explained above, the present invention is not limited thereto and various modifications can be made thereto. For example, as long as the color light X, the color light Y, and the color light Z are primary color lights which are different from one another, the color light X may be green light or blue light, the color light Y may be blue light or red light, and the color light Z may be red light or green light. Moreover, the number of the time divisions, which sequentially continue in terms of time in each frame of an image to be displayed, is not limited to six, but the number thereof may be suitably selected. Moreover, although three laser light sources, that is, the first laser light source 11X, the second laser light source 11Y, and the third laser light source 11Z, are used in the above-described embodiments as means for obtaining the color light X, the color light Y, and the color light Z, the color light X, the color light Y, and the color light Z may be formed from white light emitted from a single white light source by using spectrum optical elements such as dichroic mirrors. Moreover, in the first embodiment, as long as the retardation plate 26 is arranged on either one of the optical path from the first color synthesizing optical element 20 to the optical image synthesizing mechanism 40 through the first spatial modulation element 30 or the optical path from the second color synthesizing optical element 25 to the optical image synthesizing mechanism 40 through the second spatial modulation element 35, the retardation plate 26 may be specifically arranged on the optical path of the second synthesized light $G^2$ between the second spatial modulation element 35 and the optical image synthesizing mechanism 40, on the optical path of the first synthesized light $G^1$ between the first color synthesizing optical element 20 and the first spatial modulation element 30, or on the optical path of the first synthesized light $G^1$ between the first spatial modulation element 30 and the optical image synthesizing mechanism 40. Moreover, in the second embodiment, three color lights, that is, the color light X, the color light Y, and the color light Z, may be simultaneously projected in each of the time division S1-S6.

The preceding description has been presented only to illustrate and describe exemplary embodiments of the present light source device. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope.

What is claimed is:

1. A light source device for a projector comprising:
   a first color light source unit configured to form and emit a first division color light $X^1$ by directing a color light X along an optical path xI and a second division color light $X^2$ by directing a color light X along an optical path xII;
   a second color light source unit configured to form and emit a first division color light $Y^1$ by directing a color light Y along an optical path yI and a second division color light $Y^2$ by directing a color light Y along an optical path yII;
   a third color light source unit configured to form and emit a first division color light $Z^1$ by directing a color light Z along an optical path zI and a second division color light $Z^2$ by directing a color light Z along an optical path zII;
   a first color synthesizing optical element configured to synthesize light from the optical path xI, the optical path yI, and the optical path zI into a first synthesized light and emit the first synthesized light;
   a second color synthesizing optical element configured to synthesize light from the optical path xII, the optical path yII, and the optical path zII into a second synthesized light and emit the second synthesized light;
   a first spatial modulation element configured to receive the first synthesized light and emit a first light image;
   a second spatial modulation element configured to receive the second synthesized light and emit a second light image, the second spatial modulation element being driven in conjunction with the first spatial modulation element;
   an optical image synthesizing mechanism configured to synthesize the first light image and the second light image into a synthesized light image and to emit the synthesized light image; and
   a synthesized light image projection element configured to project the synthesized light image;
   wherein:
   each frame of the synthesized light image is divided into a plurality of time periods and in each of the plurality of time periods two or more of the color light X, the color light Y, and the color light Z are configured to be projected simultaneously.

2. The light source device for a projector, according to claim 1 wherein:
   one of red light, green light and blue light corresponds to the color light X;
   one of red light, green light and blue light that does not correspond to the color light X, corresponds to the color light Y; and
   one of red light, green light and blue light that does not correspond to the color light X or the color light Y, corresponds to the color light Z.

3. The light source device for a projector according to claim 1, wherein:
   the first color light source unit includes a first laser light source that emits the color light X, and a first optical path switching element that changes an optical path of the color light X;
   the second color light source unit includes a second laser light source that emits the color light Y, and a second optical path switching element that changes an optical path of the color light Y; and
   the third color light source unit includes a third laser light source that emits the color light Z, and a third optical path switching element that changes an optical path of the color light Z.

4. The light source device for a projector according to claim 1, wherein:
   the optical image synthesizing mechanism comprises a color wheel.

5. The light source device for a projector according to claim 1, wherein:
   each of the first division color light $X^1$, the second division color light $X^2$, the first division color light $Y^1$, the second division color light $Y^2$, the first division color light $Z^1$ and the second division color light $Z^2$ is p-wave linear polarization light or s-wave linear polarization light;
   the optical image synthesizing mechanism comprises a polarization beam splitter; and
   a retardation plate is arranged on either one of the optical path from the first color synthesizing optical element to the optical image synthesizing mechanism or the optical path from the second color synthesizing optical element to the optical image synthesizing mechanism and is configured to change a kind of the linear polarization of light passing through the retardation plate.

6. The light source device for a projector according to claim 4, wherein:
   the each frame is divided into six time periods S1 through S6 which sequentially continue in terms of time;
   the first division color light $X^1$ enters the first spatial modulation element in the time periods S1 and S2 of the each frame;
   the first division color light $Y^1$ enters the first spatial modulation element in the time periods S3 and S4 of the each frame;
   the first division color light $Z^1$ enters the first spatial modulation element in the time periods S5 and S6 of the each frame;
   the second division color light $Y^2$ enters the second spatial modulation element in the time periods S1 and S6 of the each frame;
   the second division color light $Z^2$ enters the second spatial modulation element in the time periods S2 and S3 of the each frame; and
   the second division color light $X^2$ enters the second spatial modulation element in the time periods S4 and S5 of the each frame.

7. The light source device for a projector, according to claim 6, wherein:
   the first color light source unit forms the first division color light $X^1$ in the time periods S1 and S2 of the each frame, is not operated in the time period S3 of each frame, forms the second division color light $X^2$ in the time periods S4 an S5 of the each frame, and is not operated in the time period S6 of the each frame;
   the second color light source unit forms the second division color light $Y^2$ in the time period S1 of the each frame, is not operated in the time period S2 of each frame, forms the first division color light $Y^1$ in the time periods S3 and S4 of the each frame, is not operated in the time period S5 of the each frame, and forms the second division color light $Y^2$ in the time period S6 of the each frame; and
   the third color light source unit is not operated in the time period S1 of the each frame, forms the second division color light $Z^2$ in the time periods S2 and S3 of the each frame, is not operated in the time period S4 of the each frame, and forms the first division color light $Z^1$ in the time periods S5 and S6 of the each frame.

8. The light source device for a projector, according to claim 6, wherein:
   the first color light source unit forms the first division color light $X^1$ in the time periods S1, S2 and S3 of the each frame, and forms the second division color light $X^2$ in the time periods S4, S5 and S6 of the each frame;

the second color light source unit forms the second division color light $Y^2$ in the time periods S1, S2 and S6 of the each frame, and forms the first division color light $Y^1$ in the time periods S3, S4 and S5 of the each frame; and the third color light source unit forms the first division color light $Z^1$ in the time periods S1, S5 and S6 of the each frame, and forms the second division color light $Z^2$ in the time periods S2, S3 and S4 of the each frame.

9. The light source device for a projector, according to claim 5 wherein:

the each frame is divided into six time periods S1 through S6 which sequentially continue in terms of time;

the first division color light $X^1$ enters the first spatial modulation element in the time periods S1 and S2 of the each frame;

the first division color light $Y^1$ enters the first spatial modulation element in the time periods S3 and S4 of the each frame;

the first division color light $Z^1$ enters the first spatial modulation element in the time periods S5 and S6 of the each frame;

the second division color light $Y^2$ enters the second spatial modulation element in the time periods S1 and S6 of the each frame;

the second division color light $Z^2$ enters the second spatial modulation element in the time periods S2 and S3 of the each frame; and the second division color light $X^2$ enters the second spatial modulation element in the time periods S4 and S5 of the each frame.

10. The light source device for a projector, according to claim 9 wherein:

the first color light source unit forms the first division color light $X^1$ in the time periods S1 and S2 of the each frame, is not operated in the time period S3 of the each frame, forms the second division color light $X^2$ in the time periods S4 an S5 of the each frame, and is not operated in the time period S6 of the each frame;

the second color light source unit forms the second division color light $Y^2$ in the time period S1 of the each frame, is not operated in the time period S2 of the each frame, forms the first division color light $Y^1$ in the time periods S3 and S4 of the each frame, is not operated in the time period S5 of the each frame, and forms the second division color light $Y^2$ in the time period S6 of the each frame; and the third color light source unit is not operated in the time period S1 of the each frame, forms the second division color light $Z^2$ in the time periods S2 and S3 of the each frame, is not operated in the time period S4 of the each frame, and forms the first division color light $Z^1$ in the time periods S5 and S6 of the each frame.

11. The light source device for a projector, according to claim 9 wherein:

the first color light source unit forms the first division color light $X^1$ in the time periods S1, S2 and S3 of the each frame, and forms the second division color light $X^2$ in the time periods S4, S5 and S6 of the each frame;

the second color light source unit forms the second division color light $Y^2$ in the time periods S1, S2 and S6 of the each frame, and forms the first division color light $Y^1$ in the time periods S3, S4 and S5 of the each frame; and the third color light source unit forms the first division color light $Z^1$ in the time periods S1, S5 and S6 of the each frame, and forms the second division color light $Z^2$ in the time periods S2, S3 and S4 the each frame.

* * * * *